United States Patent Office 3,165,525

Patented Jan. 12, 1965

3,165,525

PYRIDYL DERIVATIVES OF BENZOCYCLOALKANES AND BENZOCYCLOALKENES

William Laszlo Bencze, New Providence, N.J., assignor to Ciba Corporation, a corporation of Delaware No Drawing. Filed Dec. 13, 1961, Ser. No. 159,150
8 Claims. (Cl. 260—290)

The present invention relates to compounds having the formula:

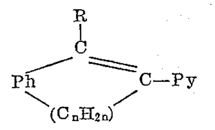

in which Ph stands for a 1,2-phenylene (o-phenylene) radical, Py represents a pyridyl group, the group R represents hydrogen or an aliphatic radical, and the group of the formula —($C_nH_{2n}$)—, in which the letter $n$ stands for a whole number from two to seven, is an alkylene radical, which separates the 1,2-phenylene radical Ph from the carbon atom carrying the pyridyl group Py by two to three carbon atoms, or salts thereof, as well as N-oxides, salts of N-oxides, quaternary ammonium derivatives of such compounds, and process for their preparation.

The 1,2-phenylene (o-phenylene) radical Ph stands for an unsubstituted 1,2-phenylene or a substituted 1,2-phenylene radical. Substituents of the latter are, for example, aliphatic groups, such as lower alkyl, e.g. methyl, ethyl, n-propyl, isopropyl, n-butyl and the like, substituted aliphatic groups, e.g. trifluoromethyl and the like, hydroxyl, etherified hydroxyl, particularly lower alkoxy, e.g. methoxy, ethoxy, n-propyloxy, isopropyloxy, n-butyloxy and the like, as well as lower alkenyloxy, e.g. allyloxy, 2-methyl-allyloxy and the like, lower alkylenedioxy, e.g. methylenedioxy and the like, lower cycloalkyloxy, e.g. cyclopentyloxy, cyclohexyloxy and the like, or any other etherified hydroxyl group, esterified hydroxyl, especially halogeno (representing hydroxyl esterified with a hydrohalic acid), e.g. fluoro, chloro, bromo and the like, mercapto, etherified mercapto, particularly lower alkylmercapto, e.g. methylmercapto, ethylmercapto and the like, nitro, amino, such as primary amino, secondary amino, for example, N-lower alkylamino, e.g. N-methylamino, N-ethylamino and the like, tertiary amino, such as N,N-dilower alkyl-amino, e.g. N,N-dimethylamino, N-ethyl-N-methylamino, N,N-diethylamino and the like, or N-acylamino, in which acyl represents the acyl radical of an organic carboxylic acid, such as an aliphatic carboxylic acid, for example, lower alkanoic acid, e.g. acetic, propionic, pivalic acid and the like, a substituted aliphatic carboxylic acid, particularly a substituted lower alkanoic acid, e.g. cyclohexylacetic, 3-cyclopentylpropionic, dichloroacetic, methoxyacetic acid and the like, a carbocyclic aryl carboxylic acid, such as benzoic acid, as well as a (lower alkoxy)-benzoic acid, e.g. 4-methoxy-benzoic, 3,4,5-trimethoxy-benzoic acid and the like, a (halogeno)-benzoic acid, e.g. 3,4-dichloro-benzoic acid and the like, an (amino)-benzoic acid, such as an (N,N-di-lower alkyl-amino)-benzoic acid, e.g. 3-N,N-dimethylamino-benzoic acid and the like, a carbocyclic aryl-aliphatic, especially a monocyclic carbocyclic aryl-lower alkane carboxylic acid, such as a phenyl-lower alkanoic acid, or a monocyclic carbocyclic aryl-lower alkene carboxylic acid, such as a phenyl-lower alkenoic acid, e.g. phenylacetic, cinnamic acid and the like, or a heterocyclic, particularly a monocyclic heterocyclic aryl carboxylic acid, such as a pyridine carboxylic acid, e.g. nicotinic, isonicotinic acid and the like, as well as furoic acid and the like, or any other suitable organic carboxylic acid.

Substituted 1,2-phenylene groups are, for example, (lower alkyl)-1,2-phenylene, e.g. (methyl)-1,2-phenylene (such as 3-methyl-1,2-phenylene, 4-methyl-1,2-phenylene, 4,5-dimethyl-1,2-phenylene and the like), (ethyl)-1,2-phenylene (such as 4-ethyl-1,2-phenylene and the like), (n-propyl)-1,2-phenylene (such as 4-n-propyl-1,2-phenylene and the like), (isopropyl)-1,2-phenylene (such as 3-isopropyl-1,2-phenylene and the like), or any other analogous (lower alkyl)-1,2-phenylene radical, (trifluoromethyl)-1,2-phenylene (such as 4-trifluoromethyl-1,2-phenylene and the like), (hydroxy)-1,2-phenylene (such as 3-hydroxy-1,2-phenylene, 4-hydroxy-1,2-phenylene and the like), (lower alkoxy)-1,2-phenylene, e.g. (methoxy)-1,2-phenylene (such as 3-methoxy-1,2-phenylene, 4-methoxy-1,2-phenylene, 3,4-dimethoxy-1,2-phenylene and the like), (ethoxy)-1,2-phenylene (such as 3-ethoxy-1,2-phenylene, 4-ethoxy-1,2-phenylene, 3,6-diethoxy-1,2-phenylene and the like), (n-propyloxy)-1,2-phenylene (such as 4-n-propyloxy-1,2-phenylene and the like), (isopropyloxy)-1,2-phenylene (such as 3-isopropyloxy-1,2-phenylene and the like), (n-butyloxy)-1,2-phenylene (such as 4-n-butyloxy-1,2-phenylene and the like) or any other analogous (lower alkoxy)-1,2-phenylene radical, (lower alkenyloxy)-1,2-phenylene, e.g. (allyloxy)-1,2-phenylene (such as 3-allyloxy-1,2-phenylene, 4-allyloxy-1,2-phenylene and the like), or any other analogous (lower alkenyloxy)-1,2-phenylene radical, (lower alkylene-dioxy)-1,2-phenylene, e.g. (methylenedioxy)-1,2-phenylene (such as 3,4-methylenedioxy-1,2-phenylene and the like), or any other analogous (lower alkylenedioxy)-1,2-phenylene radical, (halogeno)-1,2-phenylene, e.g. (fluoro)-1,2-phenylene (such as 3-fluoro-1,2-phenylene, 4-fluoro-1,2-phenylene and the like), (chloro)-1,2-phenylene (such as 3-chloro-1,2-phenylene, 4-chloro-1,2-phenylene, 4,5-dichloro-1,2-phenylene, 3,4,5,6-tetrachloro-1,2-phenylene and the like), (bromo)-1,2-phenylene (such as 4-bromo-1,2-phenylene, 3,6-dibromo-1,2-phenylene and the like), or any other analogous (halogeno)-1,2-phenylene radical, (mercapto)-1,2-phenylene (such as 4-mercapto-1,2-phenylene and the like), (lower alkyl-mercapto)-1,2-phenylene, e.g. (methylmercapto)-1,2-phenylene (such as 4-mercapto-1,2-phenylene and the like), (ethylmercapto)-1,2-phenylene (such as 3-ethylmercapto-1,2-phenylene and the like), or any other analogous (lower alkyl-mercapto)-1,2-phenylene radical, (nitro)-1,2-phenylene (such as 3-nitro-1,2-phenylene, 4-nitro-1,2-phenylene and the like), (amino)-1,2-phenylene (such as 3-amino-1,2-phenylene, 4-amino-1,2-phenylene and the like), (N-lower alkylamino)-1,2-phenylene, e.g. (N-methylamino)-1,2-phenylene (such as 3-N-methylamino-1,2-phenylene, 4-N-methylamino-1,2-phenylene and the like), (N-ethylamino)-1,2-phenylene (such as 3-N-ethylamino-1,2-phenylene and the like), or any other analogous (N-lower alkyl-amino)-1,2-phenylene radical, (N,N-di-lower alkyl-amino)-1,2-phenylene, e.g. (N,N-dimethylamino)-1,2-phenylene (such as 3-N,N-dimethylamino-1,2-phenylene, 4-N,N-dimethylamino-1,2-phenylene and the like), N-ethyl-N-methyl-amino-1,2-phenylene (such as 4-N-ethyl-N-methyl-amino-1,2-phenylene and the like), (N,N-diethylamino)-1,2-phenylene (such as 4-N,N-diethylamino-1,2-phenylene and the like), or any other (N,N-di-lower alkyl-amino)-1,2-phenylene radical, (N-acyl-amino)-1,2-phenylene, such as (N-lower alkanoyl-amino)-1,2-phenylene, e.g. (N-acetylamino)-1,2-phenylene (such as 4-N-acetylamino-1,2-phenylene and the like), (N-pivaloyl-amino)-1,2-phenylene (such as 4-N-pivaloylamino-1,2-phenylene and the like), as well as (N-benzoylamino)-1,2-phenylene (such as 4-N-benzoylamino-1,2-phenylene and the like), or any other analogous (N-acyl-amino)-1,2-phenylene radical, or any equivalent substituted 1,2-phenylene radical.

A pyridyl group Py represents an unsubstituted pyridyl radical, e.g. 2-pyridyl, 3-pyridyl or 4-pyridyl, as well as a substituted pyridyl radical, which contains lower alkyl, e.g. methyl, ethyl, n-propyl, n-butyl and the like, lower alkoxy, e.g. methoxy, ethoxy, n-propyloxy, isopropyloxy, n-butyloxy and the like, halogeno, e.g. fluoro, chloro, bromo and the like, or any other suitable group as substituents attached to any of the positions available for substitution.

The group R represents hydrogen, or an aliphatic radical, particularly lower alkyl, having preferably from one to four carbon atoms, e.g. methyl, ethyl, n-propyl, isopropyl and the like, as well as a substituted aliphatic radical, for example, a carbocyclic aryl-aliphatic radical, for example, monocyclic carbocyclic aryl-lower alkyl, primarily phenyl-lower alkyl, e.g. benzyl, 1-phenylethyl, 2-phenylethyl and the like, or phenyl-lower alkyl, in which phenyl is substituted, for example, by lower alkyl, e.g. methyl, ethyl, isopropyl and the like, lower alkoxy, e.g. methoxy, ethoxy and the like, halogeno, e.g. fluoro, chloro, bromo and the like, or any other suitable substituent.

The alkylene radical —($C_nH_{2n}$)—, in which the letter $n$ stands for a whole number from two to seven, and which separates the 1,2-phenylene radical and the carbon atom carrying the pyridyl group Py by two to three, particularly by two, carbon atoms, may form a straight or a branched carbon chain. It is primarily 1,2-ethylene, as well as 1-methyl-1,2-ethylene, 2-methyl-1,2-ethylene, 1,3-propylene, 1,3-butylene, 2,3-butylene, and the like. In view of the fact that the 1,2-phenylene radical and the carbon atom carrying the pyridyl group are separated by two to three, particularly by two, carbon atoms, the compounds of the present invention are above all those of the 3,4-dihydro-naphthalene series, as well as those of the 6,7-dihydro-5H-benzocycloheptene (benzosuberene) series.

Salts of the compounds of this invention are particularly pharmaceutically acceptable, non-toxic acid addition salts, primarily those with inorganic acids, e.g. hydrochloric, hydrobromic, nitric, sulfuric, phosphoric acids, as well as with organic acids, such as organic carboxylic acids, e.g. acetic, glycolic, maleic, hydroxymaleic, dihydroxymaleic, malic, tartaric, citric, salicylic acid and the like, or organic sulfonic acids, e.g. methane sulfonic, ethane sulfonic, 2-hydroxyethane sulfonic, p-toluene sulfonic acid and the like. Salts which are primarily used for identification purposes are particularly those with acidic organic nitro compounds, e.g. picric, picrolonic, flavianic acid and the like, or with metal complex acids, e.g. phosphotungstic, phosphomolybdic, chloroplatinic, Reinecke acid and the like.

Also included within the scope of this invention are the N-oxides and the salts, particularly the pharmaceutically acceptable acid addition salts, of such N-oxides with the above-mentioned inorganic and organic acids.

Quaternary ammonium derivatives of the compounds of this invention are particularly those with reactive esters formed by hydroxylated compounds and strong acids, such as those with lower alkyl halides, e.g. methyl, ethyl, propyl or isopropyl chloride, bromide or iodide and the like, di-lower alkyl sulfates, e.g. dimethyl sulfate, diethyl sulfate and the like, lower alkyl lower alkane sulfonates, e.g. methyl or ethyl methane sulfonate or ethane sulfonate and the like, lower alkyl monocyclic carboxylic aryl sulfonates, e.g. methyl p-toluene sulfonate and the like, phenyl-lower alkyl halides, e.g. benzyl, 1-phenylethyl or 2-phenylethyl chloride, bromide or iodide and the like, or any other suitable reactive ester compound. Also included as quaternary ammonium compounds are the quaternary ammonium hydroxides, and the quaternary ammonium compounds having as anions those of other inorganic or organic acids, such as, for example, those of the acids used for the preparation of the previously-mentioned acid addition salts.

The compounds of the present invention may be in the form of mixtures of isomers or single isomers.

The compounds of this invention inhibit certain functions of the adrenal cortex. Thus, they decrease the excretion of hydrocortisone (compound F), which is accompanied by an increase of the excretion corticosterone (compound B), whereas the excretion of 11-desoxy-17α-hydroxy-corticosterone (compound S) is not affected; it appears that these compounds preferentially inhibit the 17α-hydroxylase enzyme system.

The compounds of the present invention having specific adrenal cortex inhibiting effects, can, therefore, be used as diagnostic tools for the determination of the functioning of the pituitary gland, as well as in the treatment of conditions causing adrenal cortical hyperfunction, such as Cushing's syndrome, primary aldosteronism, secondary aldosteronism and the like. Furthermore, the preferential inhibition of certain functions of the adrenal cortex makes the compounds of this invention useful as aids in the study of biosynthetic pathways of corticoid synthesis.

The compounds of the formula:

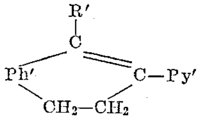

in which Ph' stands for 1,2-phenylene, (lower alkyl)-1,2-phenylene, (hydroxy)-1,2-phenylene, (lower alkoxy)-1,2-phenylene, (halogeno)-1,2-phenylene, (nitro)-1,2-phenylene or (amino)-1,2-phenylene, Py' represents pyridyl, particularly 3-pyridyl or 4-pyridyl, R' is hydrogen or lower alkyl, particularly methyl, and the pharmaceutically acceptable, non-toxic acid addition salts thereof show a pronounced inhibition of the 17α-hydroxylase enzyme system.

The new compounds of this invention may be used in the form of pharmaceutical preparations, which contain the new compounds of this invention in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other carrier for pharmaceutical preparations. The latter may be in the solid form, for example, as capsules, tablets, dragees and the like, or in liquid form, for example, as solutions, suspensions, emulsions and the like. If desired, they may contain auxiliary substances such as preserving, stabilizing, wetting, emulsifying agents and the like, salts for varying the osmotic pressure, buffers, etc. They may also contain, in combination, other pharmacologically useful substances.

The compounds of this invention may be prepared according to known methods; for example, they can be formed by eliminating water from the compound of the formula:

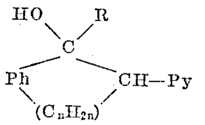

in which Ph, Py, R, the letter $n$ and the group of the formula —($C_nH_{2n}$)— have the previously-given meaning, or a salt, an N-oxide or a salt of an N-oxide thereof, by dehydration, and, if desired, converting a resulting salt into the free compound or into another salt, and/or, if desired, introducing a substituent into the 1,2-phenylene portion of a resulting compound, and/or, if desired, converting a substituent attached to the 1,2-phenylene portion of a resulting compound into another substituent, and/or, if desired, converting a resulting compound into a salt, an N-oxide or a quaternary ammonium derivative thereof, and/or, if desired, converting an N-oxide into a salt thereof, and/or, if desired, converting a resulting quaternary ammonium compound into another quaternary ammonium compound, and/or, if desired, separating a resulting mixture of isomers into the single isomers.

The elimination of water from the starting material may be achieved according to known dehydration methods, for example, by merely heating the starting material, or, preferably, by treating it with a dehydrating agent, primarily with an acidic dehydrating agent. Suitable dehydrating agents are, for example, mineral acids, e.g. hydrochloric, hydrobromic, sulfuric, phosphoric acid and the like, anhydrides of mineral acids, e.g. phosphorus pentoxide and the like, organic acids, such as organic carboxylic acids, e.g. acetic acid and the like, as well as anhydrides thereof, e.g. acetic acid anhydride and the like; or organic sulfonic acids, e.g. p-toluene sulfonic acid and the like. Other useful acidic dehydrating reagents are certain salts of weak organic bases with strong inorganic acids, e.g. pyridine hydrochloride, quinoline hydrochloride and the like, or any other suitable acidic dehydrating reagent, as well as mixtures of such reagents, for example, the mixture of a mineral acid, e.g., hydrochloric acid and the like, and a suitable organic acid, e.g. acetic acid and the like. Dehydration may be achieved at room temperature, but is more efficiently accomplished at an elevated temperature. The acidic dehydration reagents may simultaneously serve as diluents; if necessary, other inert solvents may be added to ensure a complete solution. Furthermore, the reaction may be carried out in a closed vessel, and/or, in the atmosphere of an inert gas, e.g. nitrogen.

The starting materials having the above formula are new and are intended to be included within the scope of this invention. Particularly useful as starting materials are the compounds of the formula:

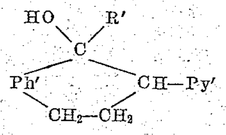

in which Ph′, Py′ and R′ have the previously-given meaning, or the acid addition salts thereof.

The starting materials may be prepared, for example, by converting in a compound of the formula:

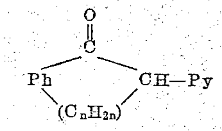

in which Ph, Py, the letter *n* and the group of the formula —($C_nH_{2n}$)— have the previously-given meaning, the carbonyl group into a carbinol group by reduction, if necessary, simultaneously introducing an aliphatic radical R, and, if desired, converting a resulting salt into the free compound, and/or, if desired, introducing into the 1,2-phenylene portion of a resulting compound a substituent, and/or, if desired, converting in a resulting compound a substituent attached to the 1,2-phenylene portion into another substituent, and/or, if desired, converting a resulting compound into a salt, an N-oxide or a salt of an N-oxide thereof.

The conversion of the carbonyl group into the carbinol group is carried out according to known method. Reduction without the simultaneous introduction of an aliphatic radical R may be achieved by treatment with a complex hydride reducing reagent, e.g. lithium aluminum hydride, sodium borohydride and the like, with hydrogen in the presence of a catalyst containing a metal of the eighth group of the Periodic System, e.g. Raney nickel, a palladium catalyst and the like, or any other suitable reducing reagent used for the conversion of a carbonyl group into a carbinol group.

Reduction of the carbonyl group of the starting material into a carbonyl group with simultaneous introduction of the aliphatic group R is carried out by reacting the starting material with an organo-metallic reagent of the formula:

$$M^{\oplus} \quad R^{\ominus}$$

in which R has the previously-given meaning, and $M^{\oplus}$ stands for the positively charged ion of certain metals of the IA-group of the Periodic System or, more particularly, for the positively charged ion of the formula Met–Hal⊕, in which Met represents certain divalent metals of the IIA-group and the IIB-group of the Periodic System, and Hal stands for halogen. The ion $M^{\oplus}$ represents primarily the positive ion of an alkali metal, such as sodium, or particularly lithium, or, more especially, the positive ion of the formula Mg–Hal⊕, in which Hal represents halogeno, e.g. chloro, bromo, iodo and the like. Both types of reagents are used under analogous conditions; preferably, the alkali metal compound or the Grignard reagent is prepared separately and is then reacted with the ketone. The solvent used during the preparation of the reagent, for example, a di-lower alkyl ether, particularly diethyl ether, may be diluted or replaced by other solvents, for example, by other ethers, such as monocyclic carbocyclic aryl lower alkyl ethers, e.g. anisole and the like, bismonocyclic carbocyclic aryl ethers, e.g. diphenyl ether and the like, cyclic ethers, e.g. tetrahydrofuran, p-dioxane and the like, organic bases, e.g. pyridine, N-methyl-morpholine and the like, monocyclic carbocyclic aryl hydrocarbons, e.g. benzene, toluene, xylene and the like, aliphatic hydrocarbons, e.g. pentane, hexane and the like, or any other suitable solvent. The reaction may be carried out while cooling, at room or at an elevated temperature; if necessary, the atmosphere of an inert gas, e.g. nitrogen, may be required, particularly when an alkali metal reagent is used. The resulting reaction mixture may be worked up according to known methods. Thus, a complex resulting from the reaction with a Grignard reagent may be broken, for example, by adding a weak acid, such as an aqueous solution of ammonium chloride and the like, to the reaction mixture, and the desired product may then be isolated according to standard procedures.

The intermediates used in the above reaction may be prepared according to known methods; for example, the salt of a compound of the formula:

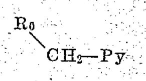

in which Py has the previously-given meaning, and $R_0$ represents a functionally converted carboxyl group, is reacted with a reactive ester of a phenyl-lower alkanol, particularly with a compound of the formula:

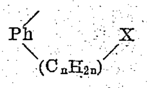

in which Ph, the letter *n* and the group of the formula —($C_nH_{2n}$)— have the previously-given meaning, and X represents a reactively esterified hydroxyl group, particularly a halogeno atom, if necessary, a functionally converted carboxyl group in a resulting compound is converted into the freec arboxyl group or into another functionally converted carboxyl group, and a resulting compound of the formula:

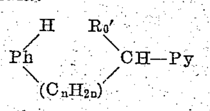

in which Ph, Py the letter *n* and the group of the formula —($C_nH_{2n}$)— have the previously-given meaning, and $R'_0$ stands for a carboxyl group or a functionally converted carboxyl group, or a salt, an N-oxide or a salt of an N-oxide of such compound, is treated with a strong Lewis acid ring closing reagent.

The several steps of the above procedure are carried out according to known methods. A salt of a functional derivative of a pyridyl-acetic acid is primarily an alkali metal salt, e.g. lithium, sodium, potassium and the like, salt; the latter may be prepared, for example, by treatment with an alkali metal, e.g. sodium and the like, an alkali metal hydroxide, e.g. lithium hydroxide, sodium hydroxide, potassium hydroxide and the like, an alkali metal hydride, e.g. sodium hydride and the like, an alkali metal amide, e.g. sodium amide, potassium amide and the like, an alkali metal lower alkanolate, e.g. sodium or potassium methanolate, ethanolate, n-butanolate, tertiary butanolate and the like, or any other suitable reagent, using appropriate inert solvents as diluents. A functionally converted carboxyl group as represented by $R_0$ is primarily a cyano group; the salt of a functional derivative of a pyridyl acetic acid is, therefore, primarily a salt, particularly an alkali metal salt of a pyridyl-acetonitrile having the formula:

$$N\equiv C-CH_2-Py$$

in which Py has the previously-given meaning.

The reactively esterified hydroxyl group of the second reagent, as represented by X in the above formula, is primarily a hydroxyl group esterified with a strong inorganic acid, particularly mineral acid, e.g. hydrochloric, hydrobromic, hydroiodic, sulfuric acid and the like, or a strong organic sulfonic acid, e.g. p-toluene sulfonic acid and the like. The group X is, therefore, above all a halogeno atom, e.g. chloro, bromo, iodo and the like, as well as any other analogous, reactively esterified hydroxyl group. These compounds may be prepared, for example, by treating the corresponding phenyl-lower alkanol with an appropriate reagent capable of converting a free hydroxyl group into a reactively esterified hydroxyl group, particularly into a halogeno group, for example, by treatment with a thionyl halide, e.g. thionyl chloride and the like, a phosphorus halide, e.g. phosphorus tribromide and the like, or any other suitable reagent.

The reaction of the salt of a functionally converted pyridyl-acetic acid and the reactive ester of a phenyl-lower alkanol is carried out according to known methods, preferably in the presence of an inert solvent, for example, toluene, N,N-dimethylformamide and the like, and if necessary, while cooling or heating, and/or in the atmosphere of an inert gas, e.g. nitrogen.

A functionally converted carboxyl group $R_0$ in a compound resulting from such procedure is converted into a free carboxyl or another functionally converted carboxyl group, represented by $R'_0$ in the above formula, according to known methods. For example, a cyano group may be converted into a carbamyl group or a free carboxyl group by treatment with an aqueous solution of an alkali metal hydroxide, e.g. sodium hydroxide and the like. The group $R'_0$ is preferably a free carboxyl group, but may also stand for a functionally converted carboxyl group, such as, for example, carbamyl, as well as carbo-lower alkoxy, e.g. carbomethoxy, carbethoxy and the like, halogeno-carbonyl, e.g. chlorocarbonyl and the like.

The ring closure to the desired intermediate may be effected, for example, by treating the starting material with a strong Lewis acid ring closure reagent selected from the group of Friedel-Crafts reagents, such as, for example, polyphosphoric acid, stannic chloride, aluminum chloride, sulfuric acid, hydrochloric acid, boron trifluoride and the like. If necessary, the mixture of the starting material and the ring closing reagent is diluted with an appropriate inert solvent, the selection of which depends largely on the solubility capacity of the starting material and the nature of the ring closing reagent; preferred inert solvents are, for example, benzene, toluene, hexane, carbon disulfide, diethyl ether and the like. The reaction is preferably carried out at an elevated temperature, if necessary, in a closed vessel and/or in the atmosphere of an inert gas, e.g. nitrogen.

A substituent may be introduced into the 1,2-phenylene portion of a resulting compound. For example, upon nitration with a suitable nitrating reagent a nitro group may be introduced into the aromatic portion.

Substituents attached to the 1,2-phenylene portion of the resulting compounds may be converted into other substituents. For example, a nitro group may be reduced to an amino group according to known reduction methods, for example, by controlled treatment with hydrogen in the presence of a suitable catalyst, e.g. palladium on charcoal and the like, and of an inert solvent, e.g. p-dioxane and the like. An amino group may be converted into halogeno by diazotization, followed by treatment with a cuprous halide according to the Sandmeyer reaction. Or, a lower alkoxy, e.g. methoxy and the like, group may be converted into a free hydroxyl group, for example, by acidic hydrolysis with hydrobromic acid in the presence of acetic acid and the like.

A resulting salt may be converted into the free base, for example, by treatment with a base, such as, for example, an alkali metal hydroxide, e.g. lithium hydroxide, sodium hydroxide, potassium hydroxide and the like, an alkali metal carbonate, e.g. lithium, sodium or potassium carbonate or hydrogen carbonate and the like, ammonia or any other suitable base, or with an anion exchange resin and the like.

A resulting salt may be converted into another salt according to known methods, for example, by treatment with an appropriate salt, e.g. sodium, potassium, silver and the like, salt of an acid, such as one of the above described acids, preferably in the presence of a suitable inert solvent.

A resulting free base may be converted into its acid addition salts by reacting the former with an acid, such as one of those mentioned above, for example, by treating a solution of the base in a suitable inert solvent or solvent mixture with the acid or a solution thereof and isolating the desired salt. Salts may also be obtained in the form of hydrates, e.g. hemihydrates, monohydrates, sesquihydrates or polyhydrates, or may contain solvent of crystallization depending on the conditions used in the formation of the salts.

An N-oxide of a resulting compound may be prepared according to known methods, for example, by treatment with a peracid, particularly an organic carboxylic peracid, e.g. peracetic, perbenzoic, perphthalic acid and the like, or any other suitable peracid, as well as with other N-oxidation reagents, e.g. hydrogen peroxide and the like, preferably in an inert solvent.

A compound of this invention may be converted into a quaternary ammonium derivative, for example, by reacting it with a reactive ester formed by a hydroxylated compound and a strong acid. Reactive esters are primarily those yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen. A resulting quaternary ammonium compound may be converted into another quaternary ammonium compound, such as a quaternary ammonium hydroxide, for example, by reacting a quaternary ammonium halide with silver oxide, or a quaternary ammonium sulfate with barium hydroxide, or by treating a quaternary ammonium salt with an anion exchanger, or by electrodiolysis. From a resulting quaternary ammonium hydroxide there may be prepared other quaternary ammonium salts with acids, such as those mentioned for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be obtained as hydrates.

The new compounds of this invention may be obtained in the form of mixtures of isomers, which may be separated into the individual isomers according to known methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being a limitation thereon. Temperatures are given in degrees centigrade.

*Example 1*

A mixture of 9.2 g. of 1-hydroxy-2-(3-pyridyl)-1,2,3,4-tetrahydro-naphthalene in 50 ml. of concentrated hydrochloric acid is refluxed; after cooling, the solution is neutralized with a 40 percent solution of sodium hydroxide in water and with solid sodium hydrogen carbonate. The aqueous solution is extracted three times with diethyl ether, the organic layer is separated and evaporated, and the remaining oil is distilled to yield the desired 2-(3-pyridyl)3,4-dihydro-naphthalene of the formula:

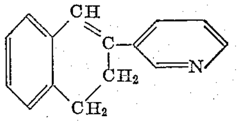

B.P. 120–130°/0.03 mm., which crystallizes while standing, M.P. 28–30°; yield: 8.0 g. The product is recrystallized by dissolving it in a mixture of hexane and diethyl ether, driving off the diethyl ether with nitrogen, adding pentane, seeding and allowing to stand in the cold, M.P. 33–34°.

The starting material used in the above procedure may be prepared as follows: To an ice-bath cooled solution of 25.7 g. (0.218 mol) of 3-pyridyl-acetonitrile in 150 ml. of N,N-dimethylformamide is added in small portions 10.49 g. of a 53 percent suspension of sodium hydride in mineral oil (0.218 mol) while stirring. The mixture is agitated at room temperature until hydrogen evolution ceases and is then again cooled in an ice-bath. A solution of 40.2 g. (0.218 mol) of 2-bromoethyl-benzene in 150 ml. of toluene is added in a slow stream; the resulting mixture is stirred for three hours at room temperature and then allowed to stand overnight at room temperature. The inorganic material (sodium bromide) is filtered off, the filtrate is evaporated to a total volume of 100 ml., and diluted with water. The organic material is extracted with three portions of diethyl ether, the organic solutions are washed with a saturated aqueous sodium chloride solution, dried over sodium sulfate, filtered and evaporated to dryness. The residue is distilled to yield 30.8 g. of a yellow oil representing 4-phenyl-2-(3-pyridyl)-butyronitrile B.P. 143–150°/0.01 mm.

To a solution of 15.0 g. of 4-phenyl-2-(3-pyridyl)-butyronitrile in 60 ml. of ethanol (95 percent strength) is added a solution of 30 g. of sodium hydroxide in 30 ml. of water, and the mixture is refluxed for 64 hours. The organic solvent is evaporated under reduced pressure, more water is added and the pH is adjusted to 5 with 2 N aqueous hydrochloric acid and aqueous acetic acid. The mixture is extracted three times with diethyl ether; the organic extracts are washed with a saturated aqueous sodium chloride solution, dried over sodium sulfate and evaporated to dryness. The acetic acid remaining in the residue is driven off by blowing air over the surface of the oily product. 14.0 g. of 4-phenyl-2-(3-pyridyl)-butyric acid is recovered; the product melts at 106–108° and is recrystallized from a mixture of ethanol and water, M.P. 110–112.5°.

11 g. of 4-phenyl-2-(3-pyridyl)-butyric acid is stirred into 55 g. of polyphosphoric acid, preheated to 90°. The temperature is elevated to 105–110° and maintained at that level for 25 minutes. The resulting clear solution is stirred into ice-water, the mixture is neutralized with 50 percent aqueous sodium hydroxide while keeping the temperature below 40°. The pH is adjusted to 8 by adding sodium carbonate, and the resulting crystalline precipitate is filtered off and taken up in diethyl ether. The organic solution is washed with water and saturated aqueous sodium chloride solution, dried over sodium sulfate, filtered and evaporated to dryness to yield 9.3 g. of the colorless crystalline 2-(3-pyridyl)-1,2,3,4-tetrahydro-naphthalen-1-one, which is purified by recrystallization from a mixture of ethanol and water, and melts at 79–80°; the infrared absorption spectrum shows the characteristic conjugated carbonyl band at 1688 $cm.^{-1}$.

To an ice-cooled solution of 2-(3-pyridyl)-1,2,3,4-tetrahydro-naphthalen-1-one in 25 ml. of absolute methanol is added 3.0 g. of sodium borohydride in small portions while stirring. An additional 25 ml. of methanol is added and a colorless crystalline material precipitates. Water is added and the crystalline material is collected and washed with water to yield 9.6 g. of 1-hydroxy-2-(3-pyridyl)-1,2,3,4-tetrahydro-naphthalene, which is recrystallized from a mixture of ethanol and water, M.P. 135–145°; the two isomers are not separated and the resulting material is used in the next step.

*Example 2*

A mixture of 0.3 g. of 1-hydroxy-1-methyl-2-(3-pyridyl)-1,2,3,4-tetrahydro-naphthalene in 5 ml. of concentrated hydrochloric acid is refluxed for one hour. After neutralizing with a 40 percent solution of sodium hydroxide while cooling the solution is extracted three times with diethyl ether; the organic extracts are washed with a saturated aqueous sodium chloride solution, dried over sodium sulfate and evaporated to dryness. The remaining oily 1-methyl-2-(3-pyridyl)-3,4-dihydro-naphthalene of the formula:

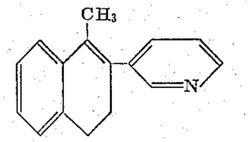

is distilled, B.P. 110–120°/0.07 mm.; yield: 0.26 g.

The starting material may be prepared as follows: To a Grignard reagent, prepared from 0.75 g. of magnesium turnings and 4.3 g. of methyl iodide in 50 ml. of diethyl ether, is added dropwise 2.0 g. of 2-(3-pyridyl)-1,2,3,4-tetrahydro-naphthalen-1-one in 50 ml. of benzene while stirring and maintaining a temperature of 15°. The reaction mixture is then heated to reflux for five hours and allowed to stand at room temperature for fifteen hours. The complex is broken by adding water and aqueous ammonium chloride, the resulting solid material suspended between aqueous and organic layer is filtered off, dried and recrystallized from ethanol and water to yield one isomer of 1-hydroxyl-1-methyl-2-(3-pyridyl)-1,2,3,4-tetrahydro-naphthalene, M.P. 196–198°. The organic layer is separated from the filtrate and combined with the crystallization mother liquors; a total of 0.35 g. of a crude material is obtained after evaporating the solvents and is recrystallized from ethanol and water, M.P. 181–182°. This material represents the other isomer of 1-hydroxy-1-methyl-2-(3-pyridyl)-1,2,3,4-tetrahydro - naphthalene; a mixture of the two isomers is used in the next step.

*Example 3*

A solution of 0.25 g. of picric acid in ethanol is added to 0.2 g. of 1-methyl-2-(3-pyridyl)-3,4-dihydro-naphthalene while maintaining a temperature of 60–70°. A yellow crystalline precipitate is formed, which is collected and washed with cold ethanol and twice with diethyl ether to yield 0.34 g. of the 1-methyl-2-(3-pyridyl)-3,4-dihydro-naphthalene picrate, which is recrystallized from boiling ethanol, M.P. 182–183°.

The above picrate is suspended in 20 ml. of a 1 N aqueous sodium carbonate solution, which is then extracted three times with diethyl ether. The organic extracts are washed with sodium hydrogen carbonate and a saturated aqueous solution of sodium chloride, dried and evaporated to dryness. The resulting oil is distilled at 125°/0.12 mm. to yield the desired 1-methyl-2-(3-pyridyl)-3,4-dihydro-naphthalene.

Other compounds which may be prepared according to the procedure of this invention are, for example, 2-(4-pyridyl)-3,4-dihydro-naphthalene,
2-(3-pyridyl)-4-methyl-3,4-dihydro-naphthalene,
6-chloro-2-(3-pyridyl)-3,4-dihydro-naphthalene,
7-chloro-2-(3-pyridyl)-3,4-dihydro-naphthalene,
8-chloro-2-(3-pyridyl)-3,4-dihydro-naphthalene,
6-methoxy-2-(3-pyridyl)-3,4-dihydronaphthalene,
(the latter, when treated with hydrobromic acid, yields the 6-hydroxy-2-(3-pyridyl)-3,4-dihydro-naphthalene),
6-methyl-2-(3-pyridyl)-3,4-dihydro-naphthalene,
7-nitro-2-(3-pyridyl)-3,4-dihydro-naphthalene,
(the latter may be reduced to form the 7-amino-2-(3-pyridyl)-3,4-dihydro-naphthalene),
1-methyl-2-(4-pyridyl)-3,4-dihydro-naphthalene,
6-chloro-1-ethyl-2-(3-pyridyl)-3,4-dihydro-naphthalene,
7-chloro-1-methyl-2-(3-pyridyl)-3,4-dihydro-naphthalene,
8-chloro-1-isopropyl-2-(3-pyridyl)-3,4-dihydro-naphthalene,
1-benzyl-6-methoxy-2-(3-pyridyl)-3,4-dihydro-naphthalene,
8-(3-pyridyl)-6,7-dihydro-5H-benzocycloheptene,
9-methyl-8-(3-pyridyl)-6,7-dihydro-5H-benzocycloheptene and the like.

What is claimed is:

1. A member selected from the group consisting of a compound of the formula

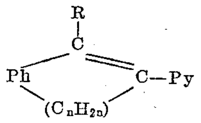

in which Ph stands for a member selected from the group consisting of 1,2-phenylene, (lower alkyl)-1,2-phenylene, (hydroxy)-1,2-phenylene, (lower alkoxy)-1,2-phenylene, (halogeno)-1,2 - phenylene, (nitro) - 1,2 - phenylene and (amino)-1,2-phenylene, Py is pyridyl, R stands for a member selected from the group consisting of hydrogen and lower alkyl, and the group of the formula—$(C_nH_{2n})$—, in which the letter *n* stands for a whole number from two to seven, is an alkylene radical separating the group Ph from the carbon atom carrying the group Py by two to three carbon atoms. and acid addition salts thereof.

2. A compound of the formula:

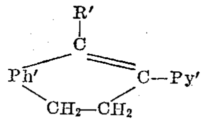

in which Ph′ stands for 1,2-phenylene, Py′ is pyridyl, and R′ stands for lower alkyl.

3. 2-(3-pyridyl)-3,4-dihydro-naphthalene.

4. 1-methyl-2-(3-pyridyl)-3,4-dihydro-naphthalene.

5. A member selected from the group consisting of a compound of the formula

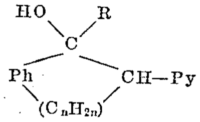

in which Ph stands for a member selected from the group consisting of 1,2-phenylene, (lower alkyl)-1,2-phenylene, (hydroxy)-1,2-phenylene, (lower alkoxy)-1,2-phenylene, (halogeno)-1,2 - phenylene, (nitro) - 1,2 - phenylene and (amino)-1,2-phenylene, Py is pyridyl, R stands for a member selected from the group consisting of hydrogen and lower alkyl, and the group of the formula —$(C_nH_{2n})$—, in which the letter *n* stands for a whole number from two to seven, is an alkylene radical separating the group Ph from the corbon atom carrying the group Py by two to three carbon atoms, and acid addition salts thereof.

6. A compound of the formula:

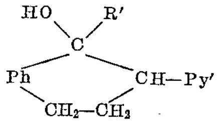

in which Ph′ stands for 1,2-phenylene, Py′ is pyridyl, and R′ stands for lower alkyl.

7. 1 - hydroxy-2-(3 - pyridyl)-1,2,3,4-tetrahydro-naphthalene.

8. 1 - hydroxy-1-methyl-2-(3 - pyridyl)-1,2,3,4-tetrahydronaphthalene.

References Cited in the file of this patent

UNITED STATES PATENTS 3,118,895 Allen ------------------- Jan. 21, 1964

OTHER REFERENCES

Chart et al.: "Endocrinology," vol. 71 (1962), pp. 479–486.

Nelson et al.: "Journal of Org. Chem.," vol. 27 (1962), pp. 964–968.

Bradsher et al.: J.A.C.S., vol. 78, pages 2459–2462 (1956).

McCarthy et. al.: J.A.C.S., vol. 79, pages 472–480 (1957).

Elks et al.: J. Chem. Soc. (London), pages 441–445 (1943).